US012599859B1

(12) United States Patent (10) Patent No.: US 12,599,859 B1

Su et al. (45) Date of Patent: Apr. 14, 2026

(54) SHOWER FILTER ELEMENT

(71) Applicant: Kaifeng Su, Dongguan (CN)

(72) Inventors: Kaifeng Su, Dongguan (CN); Bo Li, Dongguan (CN); Hai Lin, Dongguan (CN)

(73) Assignee: Kaifeng Su, Dongguan (CN)

( * ) Notice: Subject to any disclaimer, the term of this patent is extended or adjusted under 35 U.S.C. 154(b) by 0 days.

(21) Appl. No.: 19/308,409

(22) Filed: Aug. 25, 2025

(30) Foreign Application Priority Data

Jul. 25, 2025 (CN) .......................... 202511035346.X

(51) Int. Cl.

| | |
|---|---|
| *B01D 39/20* | (2006.01) |
| *B01D 24/10* | (2006.01) |
| *B01D 39/16* | (2006.01) |
| *C02F 1/00* | (2023.01) |

(52) U.S. Cl.

CPC ......... *B01D 39/2065* (2013.01); *B01D 24/10* (2013.01); *B01D 39/1623* (2013.01); *C02F 1/003* (2013.01); *B01D 2201/12* (2013.01); *B01D 2239/0654* (2013.01); *B01D 2239/10* (2013.01); *C02F 2307/06* (2013.01)

(58) Field of Classification Search

None

See application file for complete search history.

(56) References Cited

U.S. PATENT DOCUMENTS

| | | | | |
|---|---|---|---|---|
| 3,865,310 A | * | 2/1975 | Elkins | ....................... E03C 1/06 |
| | | | | 4/615 |
| 4,259,096 A | * | 3/1981 | Nakamura | ......... B01D 39/1607 |
| | | | | 96/138 |
| 4,933,080 A | * | 6/1990 | Rundzaitis | ........... B01D 35/043 |
| | | | | 4/615 |
| 5,008,011 A | * | 4/1991 | Underwood | ............ C02F 1/003 |
| | | | | 4/615 |
| 5,070,553 A | * | 12/1991 | Chambers | ................. E03C 1/06 |
| | | | | 4/615 |
| 5,152,464 A | * | 10/1992 | Farley | ..................... B05B 15/40 |
| | | | | 239/553.3 |
| 5,192,427 A | * | 3/1993 | Eger | ....................... E03C 1/046 |
| | | | | 210/232 |
| 5,213,688 A | * | 5/1993 | Robinson | ............. B01D 29/114 |
| | | | | 4/615 |

(Continued)

*Primary Examiner* — Robert J Popovics

(74) *Attorney, Agent, or Firm* — Cooper Legal Group, LLC

(57) ABSTRACT

Disclosed is a shower filter element. The shower filter element includes a filter assembly and a detachable upper end cover and a detachable lower end cover which are located at two ends of the filter assembly, the filter assembly sequentially includes a first-stage filter element composite layer, a second-stage filter element composite layer and a third-stage filter element component from outside to inside, the first-stage filter element composite layer sequentially includes an inner support layer, at least one micron-sized filter layer and an outer support layer from inside to outside, the second-stage filter element composite layer sequentially includes a support filter layer and a composite carbon fiber layer from inside to outside, the third-stage filter element component includes a filter container and a filter material arranged in the filter container. The present application achieves the effects of effectively filtering impurities in water, improving a filter effect and efficiency.

7 Claims, 6 Drawing Sheets

(56)  References Cited

U.S. PATENT DOCUMENTS

| | | | | | |
|---|---|---|---|---|---|
| 5,230,106 | A * | 7/1993 | Henkin | B05B 3/04 | 4/615 |
| D348,921 | S * | 7/1994 | Strand | D23/209 | |
| 5,385,667 | A * | 1/1995 | Steger | C02F 1/003 | 4/615 |
| 5,503,742 | A * | 4/1996 | Farley | B01D 29/01 | 210/450 |
| 5,545,314 | A * | 8/1996 | Parise | E03C 1/0409 | 4/615 |
| 5,549,822 | A * | 8/1996 | Ferguson | B05B 15/20 | 210/287 |
| 5,772,119 | A * | 6/1998 | Someya | C02F 9/20 | 4/615 |
| 5,795,471 | A * | 8/1998 | Naito | C02F 1/281 | 210/283 |
| 5,891,329 | A * | 4/1999 | Massholder | C02F 1/325 | 4/615 |
| 5,975,434 | A * | 11/1999 | Douglas | B05B 15/40 | 210/449 |
| 6,006,374 | A * | 12/1999 | Winnett | E03C 1/046 | 4/525 |
| 6,016,977 | A * | 1/2000 | Farley | B05B 15/20 | 239/525 |
| 6,056,875 | A * | 5/2000 | Farley | B01D 39/2072 | 252/178 |
| 6,096,197 | A * | 8/2000 | Hughes | C02F 1/003 | 4/615 |
| 6,187,187 | B1 * | 2/2001 | Farley | C02F 1/003 | 210/287 |
| 6,214,224 | B1 * | 4/2001 | Farley | B05B 15/65 | 210/282 |
| D444,536 | S * | 7/2001 | Farley | D23/209 | |
| 6,267,887 | B1 * | 7/2001 | Hughes | C02F 1/003 | 210/443 |
| D446,841 | S * | 8/2001 | Silva | D23/209 | |
| 6,270,023 | B1 * | 8/2001 | Farley | E03C 1/0409 | 239/525 |
| 6,325,930 | B2 * | 12/2001 | Farley | B05B 15/40 | 210/282 |
| 6,372,132 | B1 * | 4/2002 | Williams | C02F 1/003 | 210/450 |
| 6,395,172 | B1 * | 5/2002 | Koike | C02F 1/688 | 210/502.1 |
| 6,422,484 | B1 * | 7/2002 | Sasaki | A47K 3/40 | 239/282 |
| 6,537,455 | B2 * | 3/2003 | Farley | E03C 1/0409 | 239/553.3 |
| 6,599,428 | B1 * | 7/2003 | Douglas | C02F 1/281 | 210/283 |
| 6,626,378 | B2 * | 9/2003 | Sasaki | A47K 3/40 | 239/553 |
| 6,647,566 | B1 * | 11/2003 | Wang | E03C 1/046 | 4/615 |
| 6,719,218 | B2 * | 4/2004 | Cool | B05B 1/1636 | 239/443 |
| 6,732,957 | B2 * | 5/2004 | Kanaya | B05B 1/302 | 239/443 |
| 6,736,336 | B2 * | 5/2004 | Wong | B05B 15/5225 | 239/440 |
| 6,796,518 | B2 * | 9/2004 | Douglas | B05B 15/40 | 239/436 |
| 6,892,952 | B2 * | 5/2005 | Chang | E03C 1/0409 | 236/94 |
| 6,951,286 | B2 * | 10/2005 | Mueller | B05B 15/40 | 210/461 |
| RE39,142 | E * | 6/2006 | Farley | B05B 15/65 | 210/449 |
| 7,097,122 | B1 * | 8/2006 | Farley | E03C 1/0409 | 239/587.5 |
| 7,143,897 | B1 * | 12/2006 | Guzman | B01D 35/04 | 4/596 |
| 7,308,724 | B2 * | 12/2007 | Ho | E03C 1/00 | 4/603 |
| 7,468,127 | B2 * | 12/2008 | Hsu | E03C 1/0404 | 210/87 |
| 7,490,372 | B2 * | 2/2009 | Huang | B05B 15/65 | 285/46 |
| 7,866,576 | B1 * | 1/2011 | Farley | E03C 1/0409 | 239/587.5 |
| D638,514 | S * | 5/2011 | Farley | D23/209 | |
| D638,515 | S * | 5/2011 | Farley | D23/209 | |
| D665,474 | S * | 8/2012 | Farley | D23/209 | |
| D667,077 | S * | 9/2012 | Stanley | D23/209 | |
| 8,268,168 | B2 * | 9/2012 | Mang | C02F 1/003 | 210/236 |
| 8,403,241 | B2 * | 3/2013 | Jung | B05B 7/2462 | 239/525 |
| D687,513 | S * | 8/2013 | Williams | D23/209 | |
| 8,961,788 | B2 * | 2/2015 | Stanley | C02F 1/003 | 210/283 |
| 9,156,051 | B2 * | 10/2015 | Cai | B05B 1/18 | |
| 9,156,052 | B2 * | 10/2015 | Cai | B05B 15/40 | |
| D750,202 | S * | 2/2016 | Farley | D23/228 | |
| 9,504,940 | B2 * | 11/2016 | Farley | B01D 35/043 | |
| 9,505,634 | B2 * | 11/2016 | Cai | C02F 1/003 | |
| 9,745,206 | B2 * | 8/2017 | Hunter | B05B 1/18 | |
| 9,802,843 | B2 * | 10/2017 | Chang | C02F 1/48 | |
| 9,878,921 | B2 * | 1/2018 | Hunter | B05B 12/008 | |
| 10,106,435 | B2 * | 10/2018 | Chau | C02F 1/283 | |
| 10,124,350 | B2 * | 11/2018 | Cai | C02F 1/003 | |
| 10,159,991 | B2 * | 12/2018 | Sharratt | B05B 15/40 | |
| 10,183,869 | B2 * | 1/2019 | Floyd | C02F 1/003 | |
| 10,240,327 | B2 * | 3/2019 | Chernov | C02F 1/686 | |
| 10,252,197 | B2 * | 4/2019 | Chernov | B01D 35/04 | |
| 10,350,522 | B2 * | 7/2019 | Lin | B01D 35/30 | |
| 10,518,201 | B2 * | 12/2019 | Farley | A01M 7/005 | |
| 10,626,025 | B2 * | 4/2020 | Takagi | B01D 24/40 | |
| 10,737,203 | B2 * | 8/2020 | Farley | B01D 24/06 | |
| 11,179,736 | B2 * | 11/2021 | Lin | B05B 1/185 | |
| 11,192,134 | B2 * | 12/2021 | Farley | C02F 1/003 | |
| 11,401,175 | B2 * | 8/2022 | Takagi | B01D 24/40 | |
| 11,458,487 | B2 * | 10/2022 | Farley | B05B 15/40 | |
| 11,465,919 | B2 * | 10/2022 | Farley | E03C 1/0409 | |
| 12,076,671 | B2 * | 9/2024 | Wilkinson | B01D 29/13 | |
| 12,090,429 | B1 * | 9/2024 | Su | B01D 39/1623 | |
| 12,103,019 | B1 * | 10/2024 | Zhou | C02F 9/20 | |
| D1,062,989 | S * | 2/2025 | Genin | D23/209 | |
| 12,320,105 | B2 * | 6/2025 | You | B05B 1/18 | |
| 2001/0030154 | A1 * | 10/2001 | Lehrer | B01D 29/016 | 210/446 |
| 2002/0070293 | A1 * | 6/2002 | Ti | B05B 15/40 | 239/553 |
| 2002/0113145 | A1 * | 8/2002 | Wong | B05B 1/185 | 239/562 |
| 2002/0148915 | A1 * | 10/2002 | Sasaki | C02F 1/42 | 239/575 |
| 2003/0006304 | A1 * | 1/2003 | Cool | B05B 3/0417 | 239/231 |
| 2003/0034405 | A1 * | 2/2003 | Hsieh | B05B 1/18 | 239/537 |
| 2004/0056123 | A1 * | 3/2004 | Douglas | B05B 1/1654 | 239/587.4 |
| 2004/0255377 | A1 * | 12/2004 | Mueller | B05B 15/40 | 4/615 |
| 2004/0256303 | A1 * | 12/2004 | Talbot | B01D 35/04 | 210/232 |
| 2005/0035228 | A1 * | 2/2005 | Douglas | C02F 1/003 | 239/436 |
| 2005/0205475 | A1 * | 9/2005 | Hsu | E03C 1/0404 | 210/85 |
| 2006/0218721 | A1 * | 10/2006 | Ho | A61H 33/6036 | 4/615 |
| 2006/0272088 | A1 * | 12/2006 | Choi | C02F 1/505 | 4/615 |
| 2006/0273201 | A1 * | 12/2006 | Wu | B05B 1/30 | 239/394 |
| 2007/0006380 | A1 * | 1/2007 | Huang | E03C 1/042 | 4/615 |

(56)        References Cited

U.S. PATENT DOCUMENTS

| | | | | |
|---|---|---|---|---|
| 2007/0235381 | A1* | 10/2007 | Tsai | C02F 1/003 |
| | | | | 210/287 |
| 2008/0011656 | A1* | 1/2008 | Lacy | C02F 1/003 |
| | | | | 210/232 |
| 2008/0185456 | A1* | 8/2008 | McCabe | E03C 1/0409 |
| | | | | 4/615 |
| 2008/0289097 | A1* | 11/2008 | Jeong | B05B 1/185 |
| | | | | 4/615 |
| 2011/0147286 | A1* | 6/2011 | Mang | E03C 1/066 |
| | | | | 210/236 |
| 2011/0290913 | A1* | 12/2011 | Jung | B05B 7/2462 |
| | | | | 239/310 |
| 2011/0297624 | A1* | 12/2011 | Smith | C02F 1/003 |
| | | | | 210/232 |
| 2012/0031511 | A1* | 2/2012 | Farley | E03C 1/0408 |
| | | | | 137/544 |
| 2012/0055886 | A1* | 3/2012 | Hunter | B01D 35/153 |
| | | | | 210/85 |
| 2012/0055888 | A1* | 3/2012 | Hunter | A47K 3/286 |
| | | | | 210/767 |
| 2013/0319929 | A1* | 12/2013 | Farley, Jr. | B01D 24/165 |
| | | | | 210/444 |
| 2013/0334116 | A1* | 12/2013 | Stanley | E03C 1/046 |
| | | | | 210/232 |
| 2014/0042240 | A1* | 2/2014 | Cai | B05B 15/40 |
| | | | | 239/71 |
| 2014/0042241 | A1* | 2/2014 | Cai | E03C 1/0409 |
| | | | | 239/71 |
| 2015/0298143 | A1* | 10/2015 | Farley | B01D 35/043 |
| | | | | 239/553 |
| 2017/0000993 | A1* | 1/2017 | Lin | E03C 1/046 |
| 2017/0144090 | A1* | 5/2017 | Lin | C02F 1/003 |
| 2017/0326561 | A1* | 11/2017 | Sharratt | B05B 15/40 |
| 2018/0133630 | A1* | 5/2018 | Huat | E03C 1/0409 |
| 2018/0133739 | A1* | 5/2018 | Huat | B01D 35/04 |
| 2018/0161711 | A1* | 6/2018 | Chernov | B01D 35/04 |
| 2018/0193851 | A1* | 7/2018 | L'Henaff | B05B 1/185 |
| 2019/0160401 | A1* | 5/2019 | Farley | B01D 35/04 |
| 2019/0176089 | A1* | 6/2019 | Isobe | C02F 1/44 |
| 2019/0184316 | A1* | 6/2019 | Farley | B01D 35/02 |
| 2019/0226124 | A1* | 7/2019 | Okuda | B01D 39/2065 |
| 2019/0329167 | A1* | 10/2019 | Lin | B01D 35/30 |
| 2019/0381527 | A1* | 12/2019 | Cohen | B05B 1/18 |
| 2020/0270146 | A1* | 8/2020 | Farley | B05B 1/18 |
| 2021/0023507 | A1* | 1/2021 | Lee | B01D 35/04 |
| 2021/0380447 | A1* | 12/2021 | Song | B01J 20/3007 |
| 2022/0249987 | A1* | 8/2022 | Oh | B01D 35/04 |
| 2022/0341137 | A1* | 10/2022 | You | B05B 15/40 |
| 2024/0025765 | A1* | 1/2024 | Carosi | E03C 1/0408 |
| 2024/0262714 | A1* | 8/2024 | Weitz | B01D 39/2082 |
| 2024/0342742 | A1* | 10/2024 | Farley | B01D 35/04 |
| 2025/0025897 | A1* | 1/2025 | Zhou | C02F 1/003 |

* cited by examiner

SHOWER FILTER ELEMENT

CROSS-REFERENCE TO RELATED APPLICATION

The present application claims the priority and benefit of Chinese patent application No. 202511035346.X, filed on Jul. 25, 2025. The entirety of Chinese patent application No. 202511035346.X is hereby incorporated by reference herein and made a part of this specification.

TECHNICAL FIELD

The present application relates to the field of shower filter elements, and in particular, to a shower filter element.

BACKGROUND ART

A shower filter element can filter impurities, and avoid that the impurities enter a shower nozzle, block the nozzle and influence water outlet smoothness, so as to guarantee normal spraying of water flow and improve a comfort level of bathing. Meanwhile, water can be purified, the filtered water is purer and milder, stimulation to the skin is reduced, and uncomfortable symptoms, such as dry skin, pruritus and allergies, are reduced.

Currently, the shower filter element mainly features a compact global design, a small occupied space and convenient mounting, and in use, it is only required to connect a filter module between a shower head and a hose after the shower head is separated from the hose, such that an operation is simple, anyone can perform replacement easily, and a user can conveniently make use in different places.

However, the shower filter element with small space occupation presents various problems in practical use. Firstly, the filter element is prone to be blocked. Due to the limited internal space, a filter area and an impurity holding capacity of the filter element are limited. During filtration, the impurities are rapidly accumulated to block pores of the filter element. Therefore, resistance is increased during passage of the water flow, the water flow is not smooth, bathing experience is affected, and even a shower cannot supply water normally due to severe blockage of the filter element, thus interrupting a bathing process.

The frequently blocked filter element is required to be periodically replaced by the user. Therefore, on the one hand, a use cost is increased, and the user is required to continually purchase new filter elements to maintain proper working of the shower. On the other hand, although a single operation is simple, frequent replacement of the filter element may cause inconvenience to the user over long-term accumulation. Furthermore, an improper operation during replacement of the filter element may cause a sealing performance of a connection part of the shower to be damaged to cause water leakage, thus further affecting normal use of the shower. From the perspective of a use effect, a filter efficiency of the blocked filter element is reduced, the water cannot be fully purified, and some impurities can still enter the nozzle to block orifices and damage a nozzle structure, thus shortening a service life of the shower.

SUMMARY

In order to solve the problems that although an existing shower filter element with small space occupation meets the requirement of convenient mounting to a certain extent, the existing shower filter element is prone to be blocked and has a high maintenance cost, a short service life, or the like, the present application provides a shower filter element.

In a first aspect, the present application provides a shower filter element, which adopts the following technical solution.

A shower filter element, including a filter assembly and an upper end cover and a lower end cover which are located at two ends of the filter assembly, wherein the upper end cover and the lower end cover are detachably connected with the filter assembly;

the filter assembly sequentially includes a first-stage filter element composite layer, a second-stage filter element composite layer and a third-stage filter element component from outside to inside, and the third-stage filter element component includes a filter container and a filter material arranged in the filter container;

the second-stage filter element composite layer sequentially includes a support filter layer and a composite carbon fiber layer from inside to outside, the composite carbon fiber layer includes a carbon fiber layer and a wrapping filter layer wrapping a surface of the carbon fiber layer, the support filter layer is of a cylindrical structure, and the filter container is placed in the cylindrical structure;

the first-stage filter element composite layer sequentially includes an inner support layer, at least one micron-sized filter layer and an outer support layer from inside to outside, and the inner support layer surrounds the composite carbon fiber layer.

Preferably, the micron-sized filter layer is a micron-sized meltblown filter layer, and specifically may be 10-micron-sized, 15-micron-sized, 16-micron-sized, 17-micron-sized, 18-micron-sized, 19-micron-sized, 20-micron-sized, 21-micron-sized, 22-micron-sized, 23-micron-sized, 24-micron-sized, 25-micron-sized, 26-micron-sized, 27-micron-sized, 28-micron-sized, 29-micron-sized, and 30-micron-sized.

Preferably, the micron-sized filter layer consists of a 15-micron-sized meltblown filter layer and a 30-micron-sized meltblown filter layer.

Preferably, the micron-sized filter layer consists of a 10-micron-sized meltblown filter layer and a 20-micron-sized meltblown filter layer.

Preferably, the micron-sized filter layer consists of a 10-micron-sized meltblown filter layer, a 17-micron-sized meltblown filter layer and a 20-micron-sized meltblown filter layer.

By adopting the above-mentioned technical solution, the problems that the existing small filter element is prone to be blocked and has a high maintenance cost and a short service life can be effectively solved. The support filter layer in the second-stage filter element composite layer is of the cylindrical structure, the filter container is placed in the support filter layer, and the first-stage filter element composite layer includes the inner support layer, the outer support layer and the plurality of micron-sized filter layers, such that the global design ingeniously increases a filter area and an impurity holding capacity in the filter element. Compared with the traditional small filter element, more impurities can be contained in the same volume, a service time of the filter element between two times of replacement is prolonged, and the condition that water flow is not smooth or even bathing is interrupted due to blockage is reduced.

The micron-sized filter layer in the first-stage filter element composite layer can first intercept larger particle impurities, such as silt and rust, so as to lower a filter pressure of the subsequent filter layers. The composite carbon fiber layer in the second-stage filter element composite layer adsorbs soluble impurities and an unpleasant odor, and the wrapping filter layer therefor can further intercept fine impurities. The filter material in the third-stage filter element component can finely filter remaining minuscule substances, and such layered filtering and dispersing of the impurities avoid that a certain layer of the filter element is blocked by a large quantity of impurities accumulated in a short time, thereby reducing the risk that the whole filter element is blocked, guaranteeing smooth water flow, maintaining good bathing experience, and avoiding that the water flow is reduced or interrupted due to blockage of the filter element. Multi-layer filtering and dispersing of the impurities greatly improve a filter efficiency and meanwhile reduce the problem that the impurities block the filter element.

The first-stage filter element composite layer includes the at least one micron-sized filter layer, and in combination with the layout of the outer support layer and the inner support layer, a filter space is expanded. The support filter layer in the second-stage filter element composite layer is cylindrical, the filter container in the third-stage filter element component is placed in the support filter layer, and compared with a traditional small-space single-filter-layer filter element, such a multi-layer structure design greatly increases a filter total area and the impurity holding capacity, prolongs the service time of the filter element and reduces a blocking frequency. The traditional small-space filter element needs to be replaced after 1-2 months due to blockage, and the novel filter element needs to be replaced after at least 7-20 months.

The present application retains the advantages of a compact global design, a small occupied space and convenient mounting, and meanwhile, the filter assembly is detachably connected with the upper end cover and the lower end cover, such that a user can easily disassemble the filter element for cleaning or local replacement. For some filter layers which are not completely blocked and can be recovered by cleaning, such as the support filter layer and some micron-sized filter layers, these filter layers can be continuously used after being cleaned, thus reducing a frequency and cost for replacing the whole filter element.

Preferably, the first-stage filter element composite layer is repeatedly folded into a wave shape and then enclosed in a circle along a side surface of the wrapping filter layer.

By adopting the above-mentioned technical solution, the wave-shaped folded structure greatly increases a filter area of the first-stage filter element composite layer. Therefore, the water flow can contact more filter materials in the same volume space, thereby increasing the capacity to intercept the impurities and enhancing a filter effect.

The folded wave-shaped structure creates a longer and more complex path when the water flow passes through the first stage of the filter element. This helps to decrease a speed of the water flow, prolongs a contact time of water and the filter material, and makes the impurities more easily caught and adsorbed by the filter material, thereby improving filter fineness and effectively removing the impurities in the water, such as particulate matter and colloid.

Preferably, a thickness of the support filter layer is 1-5 mm, and a thickness of the composite carbon fiber layer is 15-25 mm.

By adopting the above-mentioned technical solution, the thickness of the support filter layer is optimized, which can provide stable support for the composite carbon fiber layer, maintain the structural integrity of the composite carbon fiber layer, and meanwhile guarantee uniform passage of the water flow to improve the filter efficiency. Under an impact of the water flow and pressing of the impurities, the support filter layer is not prone to be deformed or damaged, thus guaranteeing a stable filter effect. The thickness of the composite carbon fiber layer is optimized, such that more impurities can be contained, a service life of the filter element is prolonged, the replacement frequency is reduced, and a use cost is reduced. Meanwhile, a sufficient space makes carbon fibers and the water flow fully contact, thus exerting an adsorption performance and improving stability of the filter effect.

By reasonable thickness combination of the support filter layer and the composite carbon fiber layer, multiple filter barriers are formed to jointly intercept and adsorb the impurities with different particle sizes and natures, thus improving the filter fineness and efficiency, ensuring that outlet water has high quality and therefore, the filter element is not prone to be blocked, and prolonging the service life.

Preferably, the inner support layer and the wrapping filter layer are non-woven fabric layers with a grammage of 30-90 $g/m^2$, and the outer support layer is a non-woven fabric layer with a grammage of 30-60 $g/m^2$.

By adopting the above-mentioned technical solution, the non-woven fabric layer with the grammage of 30-90 $g/m^2$ has certain strength and stiffness, and thus can provide stable support for an internal filter structure, prevent the internal filter structure from being deformed under the impact of the water flow or the pressing of the impurities, and ensure smoothness of a filter channel. Meanwhile, the non-woven fabric layer with the above grammage has a proper pore size and filter fineness, and thus can effectively intercept the impurities in a certain particle size range, play a primary filtering role, and reduce a burden of the subsequent filter layer.

The non-woven fabric layer with the grammage of 30-60 $g/m^2$ is relatively light, such that a weight of the whole filter element is not remarkably increased, and mounting and use are convenient. Meanwhile, the non-woven fabric layer has certain strength and toughness, and thus can effectively protect the internal filter structure, resist an external mechanical pressure and friction, and prevent the filter element from being damaged during mounting, use or replacement. A proper pore size and permeability of the outer support layer can guide the water flow to uniformly enter the filter element, such that the water flow can fully contact each filter material layer, thus improving uniformity and consistency of the filter effect. The outer support layer can further prevent external large impurities from directly impacting the inner filter layer, and avoid premature blockage or damage of a part of the filter layer caused by an overlarge pressure.

The inner support layer, the wrapping filter layer and the outer support layer cooperate with other filter layers (such as the micron-sized filter layer and the composite carbon fiber layer) to form a complete filter system. The layers perform filtering, adsorption and interception on the water flow in sequence according positions and functional characteristics thereof, so as to efficiently remove the impurities with different particle sizes and natures in the water, and improve the quality of the outlet water. Due to reasonable combination and a synergistic effect of the support layers and the filter layers, the filter element is not prone to be blocked in use, and a filter performance is more stable and durable, thereby prolonging the service life of the filter element, reducing the replacement frequency, and reducing the use cost.

Preferably, the support filter layer is a PP cotton stick filter layer.

By adopting the above-mentioned technical solution, the PP cotton stick filter layer has an even structure, and thus can make the water flow distributed on a cross section of the whole filter element more evenly during passage, and avoid that a part of the water flow is excessively concentrated to unevenly block the filter layer, thereby improving the whole filter effect and prolonging the service life of the filter element. Meanwhile, the PP cotton stick filter layer has high porosity and good filter fineness, and thus can effectively intercept the large particle impurities in the water, such as silt, rust and water scale, play a primary filtering role, and reduce the burden of the subsequent filter layer.

In addition, since the PP cotton stick filter layer is used as the support filter layer, the subsequent filter layer, such as the composite carbon fiber layer, can be effectively protected and prevented from being impacted by large water flow and directly impacted by the impurities, thus prolonging a service life of the subsequent filter layer, and improving the filter effect and stability of the whole filter element.

Preferably, the filter material is a KDF material.

By adopting the above-mentioned technical solution, the KDF material can efficiently remove heavy metals in the water, such as lead and mercury, and thus reduces a content of the heavy metals in the water, ensures safety of the bathing water and reduces the risk that the skin absorbs harmful substances. Meanwhile, water hardness can be reduced, scale formation of calcium and magnesium ions can be reduced, a nozzle can be kept smooth, and a service life of a shower can be prolonged. The use of the KDF material reduces the burden of the subsequent filter layer, prolongs a replacement period of the filter element and reduces the use cost.

Preferably, each of the upper end cover and the lower end cover is defined with a clamping groove, and the two ends of the filter assembly can be inserted into the clamping grooves respectively;

a bottom of the clamping groove of the lower end cover is provided with a filter screen, and a bottom of the clamping groove of the upper end cover is provided with a clamping post.

Preferably, the filter screen is a stainless steel filter screen, a plastic filter screen, a glass filter screen or a ceramic filter screen.

By adopting the above-mentioned technical solution, due to the design of the clamping groove, the filter assembly can be mounted and dismounted without a complex tool or operation, and the user can easily insert the filter assembly into the clamping groove to finish mounting or take the filter assembly out of the clamping groove for replacement or maintenance, thus achieving convenient and rapid effects and lowering use difficulty. The filter screen can prevent some large particle impurities from entering the filter assembly, which alleviates a burden of the internal filter material, and decreases blockage and loss speeds thereof, so as to prolong the service life of the whole filter element and reduce the replacement frequency and the use cost.

Preferably, a method for preparing the composite carbon fiber layer includes the following steps:

1) mixing a carbon fiber and a solvent at a mass ratio of 1:(7-8), and then crushing a resulting mixture to obtain a suspension;

2) adding diatomite, sodium carboxymethylcellulose, polyethylene glycol, a surfactant, a lead removal auxiliary agent, a chloramine removal auxiliary agent and an antibacterial agent into the suspension to obtain a slurry, and then dewatering and drying the slurry after wet forming to obtain the carbon fiber layer; and 3) wrapping the wrapping filter layer on the surface of the carbon fiber layer to obtain the composite carbon fiber layer.

Preferably, the lead removal auxiliary agent includes at least one of iron, zinc, KDF and copper.

Preferably, the chloramine removal auxiliary agent includes at least one of iron oxide, calcium sulfite, sodium sulfite and sodium thiosulfate.

Preferably, an amount of the diatomite is 5-15% of a weight of the carbon fiber, an amount of the sodium carboxymethylcellulose is 1-5% of the weight of the carbon fiber, an amount of the polyethylene glycol is 1-3% of the weight of the carbon fiber, an amount of the surfactant is 0.1-1% of the weight of the carbon fiber, an amount of the lead removal auxiliary agent is 1-1.5% of the weight of the carbon fiber, an amount of the chloramine removal auxiliary agent is 1-1.5% of the weight of the carbon fiber, and an amount of the antibacterial agent is 1-2% of the weight of the carbon fiber.

By adopting the above-mentioned technical solution, the carbon fibers are crushed and adjusted to a specific particle size to increase a specific surface area thereof, such that the carbon fibers can be more fully dispersed when being mixed with other substances in the following process, thus the capacity to adsorb micromolecular impurities, organic matter, heavy metal ions, or the like, is improved, and more efficient water purification is realized. Addition of the diatomite and other components into the slurry improves formability and a filter performance of the slurry. The wet forming, dewatering, drying, or the like, make a structure of the carbon fiber layer more compact and pore size distribution more uniform, thereby effectively intercepting impurities with smaller particle sizes, improving the filter efficiency and fineness and making the quality of the outlet water better. The addition of the sodium carboxymethylcellulose, the polyethylene glycol and other components enhances mechanical strength and stability of the carbon fiber layer, such that the carbon fiber layer is not prone to be deformed and damaged in water flow impact and use processes, and keeps a good filter performance.

By adding the antibacterial agent, the carbon fiber layer has the capacity to inhibit growth and propagation of microorganisms, such as bacteria and algae, and thus reduces breeding of the microorganisms in the filter element, reduces the risk of secondary pollution, ensures sanitation and safety of the water, and meanwhile prolongs the service life of the filter element.

By adding the lead removal auxiliary agent and the chloramine removal auxiliary agent, the composite carbon fiber layer has a stronger capacity to remove specific harmful substances, such as lead and chloramine, so as to meet requirements of people for high-quality and healthy bathing water.

The surface of the carbon fiber layer is wrapped by the wrapping filter layer to form the composite carbon fiber layer. The wrapping filter layer intercepts carbon fibers, diatomite particles, or the like, which are not tightly combined, so as to prevent the loss material from blocking the subsequent filter layer or influencing the quality of the outlet water; the impurities are further filtered to improve the filter fineness; the carbon fiber layer is protected, the structure is prevented from being damaged by mechanical damage, abrasion and the water flow impact, and the service life is prolonged.

Preferably, a process of the wet forming is as follows:

filtering the slurry on a forming mold to obtain a blank, and then performing hot pressing on the blank, with a hot pressing temperature being 100-110° C., and a hot pressing time being 20-40 s.

Control over the proper temperature and time can rearrange and distribute solid particles in the slurry, such as the diatomite, so as to form a more compact and uniform microporous structure around the carbon fiber, which can effectively intercept the impurities with smaller particle sizes and improve the filter fineness. The carbon fiber layer prepared after the hot pressing has higher compressive strength. In practical use, the carbon fiber layer can bear a large water flow pressure and mechanical stress, is not prone to be deformed or damaged, and ensures a proper working state of the filter element. This is particularly important for mounting in an environment with a certain water flow impact force, such as the shower, and breaking of the filter element, displacement of the filter layer, or the like, caused by an excessively large pressure can be prevented.

Preferably, a process of the dewatering process is as follows: performing a first hot pressing on the slurry after the wet forming for 20-30 min at a temperature of 120-150° C. and a pressure of 5-6 MPa, and then performing a second hot pressing for 5-10 min at a temperature of 180-190° C. and a pressure of 5-6 MPa; deflating, finally performing a third hot pressing for 5-8 min at a temperature of 230-250° C. and a pressure of 8-10 MPa, and ending with natural cooling.

By adopting the above-mentioned technical solution, the process of the dewatering is optimized, and the multi-stage high-temperature and high-pressure treatment in the process of the dewatering enhances the mechanical strength and the stability of the carbon fiber layer, such that the carbon fiber layer is not prone to be deformed and damaged in use, can bear a large water flow pressure, and prolongs the service life of the filter element.

In an initial stage of dewatering, a large amount of water in the slurry is urged to be primarily separated out, and meanwhile, organic components are softened, such that a foundation is laid for subsequent forming. Then, further deep dewatering is performed, such that the slurry is more compact and structural stability is enhanced. The deflating operation in the process effectively avoids generation of air bubbles and an overlarge internal pressure at the high temperature and the high pressure, and ensures that the material is uniform and compact. Finally, the final dewatering significantly improves density and strength of the carbon fiber layer, and meanwhile eliminates internal stress to prevent cracking or deformation during cooling.

The carbon fiber layer after the special dewatering has a more uniform and compact pore structure and the greatly improved filter fineness and adsorption performance, and can effectively intercept and adsorb the minuscule impurities, harmful substances and unpleasant odors in the water, so as to improve the filter effect and guarantee purity of the outlet water. Due to the enhancement of the mechanical strength, the carbon fiber layer remains stable under the large water flow pressure and mechanical stress, is not prone to be damaged, and prolongs the service life of the filter element.

In summary, the present application has the following beneficial effects.

1. Through the unique multi-stage composite structure, the shower filter element effectively solves the problems that the small filter element is prone to be blocked and has a high maintenance cost and a short service life. The plural micron-sized filter layers, the inner support layer and the outer support layer of the first-stage filter element composite layer of the shower filter element can first intercept the large particle impurities to expand the filter space; the support filter layer of the second-stage filter element composite layer is of the cylindrical structure for placing the filter container, and the composite carbon fiber layer adsorbs the soluble impurities and unpleasant odor, and the wrapping filter layer intercepts the fine impurities; and the filter material of the third-stage filter element component finely filters the remaining minuscule substances. The global design ingeniously increases the filter area and the impurity holding capacity, and compared with the traditional small filter element, the same volume can contain more impurities, the service time between two times of replacement is prolonged, and the condition that the water flow is not smooth due to blockage is reduced. Multi-layer filtering and dispersing of the impurities reduce the risk of blockage of the whole filter element, ensure the smooth water flow and improve the filter efficiency. The filter assembly is detachably connected with the upper end cover and the lower end cover, such that the user can easily detach and clean or partially replace the filter layers. The filter layers which can be recovered by cleaning can be continuously used after cleaning, such that the frequency and cost for replacing the whole filter element are reduced, the service time of the novel filter element can reach 7-20 months, and compared with the replacement period of the traditional small-space filter element of 1-2 months, the novel filter element has remarkable advantages, and meanwhile, the advantages of compactness, the small occupied space and the convenient mounting are kept by the global design.

DETAILED DESCRIPTION

Preparation Example

Preparation Example 1

Figure 1:
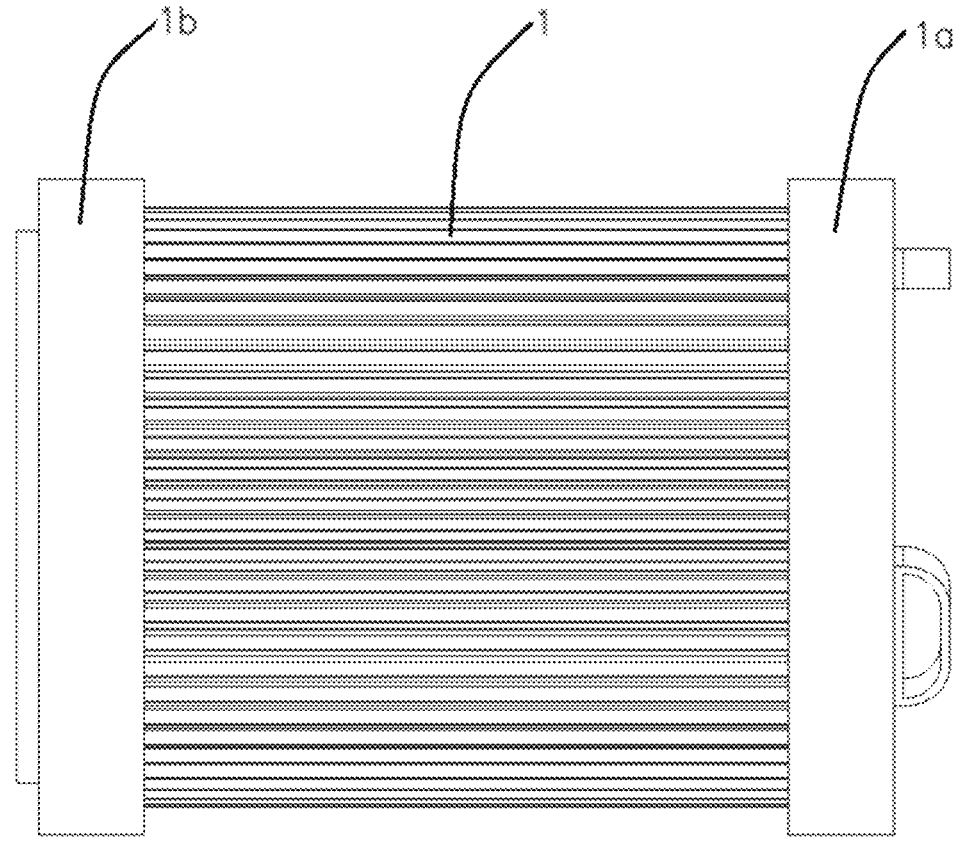
FIG. 1 is a schematic diagram of an overall structure of a shower filter element in Example 1.

A composite carbon fiber layer, which was prepared by the following method:

1) 1,000 g of a carbon fiber and 7,000 g of a solvent (water) were mixed at a mass ratio of 1:7, and then a resulting mixture was crushed to obtain a suspension, wherein a particle size of the carbon fiber after crushing is 150 mesh;

2) 50 g of diatomite, 10 g of sodium carboxymethylcellulose, 10 g of polyethylene glycol, 1 g of a surfactant (sodium dodecyl benzene sulfonate), 10 g of a lead removal auxiliary agent (iron), 10 g of a chloramine removal auxiliary agent (iron oxide) and 10 g of an antibacterial agent (chitosan) were added into the suspension to obtain a slurry, and then the slurry was subjected to dewatering and drying after wet forming to obtain a carbon fiber layer;

3) a wrapping filter layer (which is made of 300-mesh non-woven fabric) was wrapped on a surface of the carbon fiber layer to obtain the composite carbon fiber layer.

Preparation Examples 2-3 differ from Preparation Example 1 in the types, amounts and parameters of raw materials for preparing the composite carbon fiber layer, and specific differences are shown in table 1:

TABLE 1

| | Types, amounts and parameters of raw material for preparing composite carbon fiber layer in Preparation Examples 1-3 | | | |
|---|---|---|---|---|
| | Types, amounts and parameters of test raw material | Preparation Example 1 | Preparation Example 2 | Preparation Example 3 |
| 1) | Carbon fiber (g) | | 1,000 | |
| | Solvent Amount (g) | 7,000 | 7,500 | 8,000 |
| | Type | | Water | |
| 2) | Diatomite (g) | 50 | 100 | 150 |
| | Sodium carboxymethylcellulose (g) | 10 | 30 | 50 |
| | Polyethylene glycol (g) | 10 | 20 | 30 |
| | Surfactant Amount (g) | 1 | 8 | 10 |
| | Type | Sodium dodecyl benzene sulfonate | Dodecyl dimethyl benzyl ammonium chloride | Hexadecyl trimethyl ammonium chloride |
| | Lead removal auxiliary agent Amount (g) | 10 | 12 | 15 |
| | Type | Iron | Zinc | KDF |
| | Chloramine removal auxiliary agent Amount (g) | 10 | 12 | 15 |
| | Type | Iron oxide | Calcium sulfite | Sodium sulfite |
| | Antimicrobial agent Amount (g) | 10 | 15 | 20 |
| | Type | Chitosan | Nano-silver | 1-methylimidazole acetate |
| | Hot pressing Hot pressing temperature (° C.) | 100 | 105 | 110 |
| | Hot pressing time (s) | 20 | 30 | 40 |
| | First stage Temperature (° C.) | 120 | 135 | 150 |
| | Time (min) | 20 | 25 | 30 |
| | Pressure (MPa) | 5 | 5.5 | 6 |
| | Second stage Temperature (° C.) | 180 | 185 | 190 |
| | Time (min) | 5 | 8 | 10 |
| | Pressure (MPa) | 5 | 5.5 | 6 |
| | Third stage Temperature (° C.) | 230 | 245 | 250 |
| | Time (min) | 5 | 6 | 8 |
| | Pressure (MPa) | 8 | 9 | 10 | a process the wet forming was as follows:
the slurry was filtered on a forming mold to obtain a blank, and then the blank was subjected to hot pressing, with a hot pressing temperature being 100° C., and a hot pressing time being 20 s;
a process of the dewatering was as follows: the slurry after the wet forming was subjected to a first hot pressing for 20 min at a temperature of 120° C. and a pressure of 5 MPa, and then subjected to a second hot pressing for 5 min at a temperature of 180° C. and a pressure of 5 MPa; after deflation, finally subjected to a third hot pressing for 5 min at a temperature of 230° C. and a pressure of 8 MPa, and the process ended with natural cooling;

EXAMPLES

Example 1

Referring to FIG. 1, a shower filter element includes a filter assembly 1, an upper end cover 1a and a lower end cover 1b, wherein the upper end cover 1a and the lower end cover 1b are located at two ends of the filter assembly 1 and detachably connected with the filter assembly 1.

Figure 2:
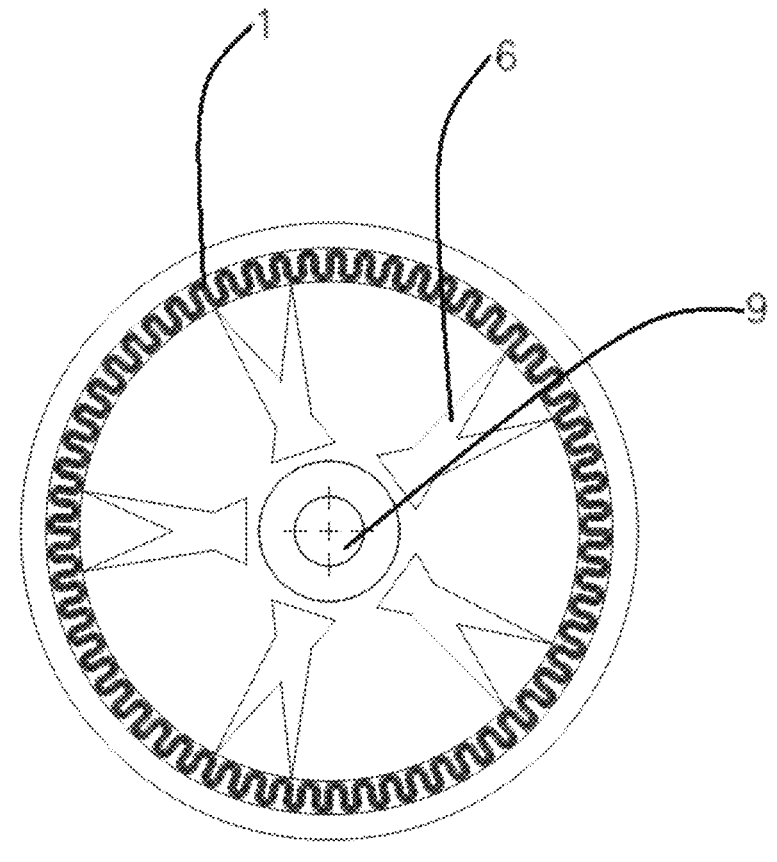
FIG. 2 is a schematic diagram of an overall structure of a filter assembly in Example 1.
Figure 3:
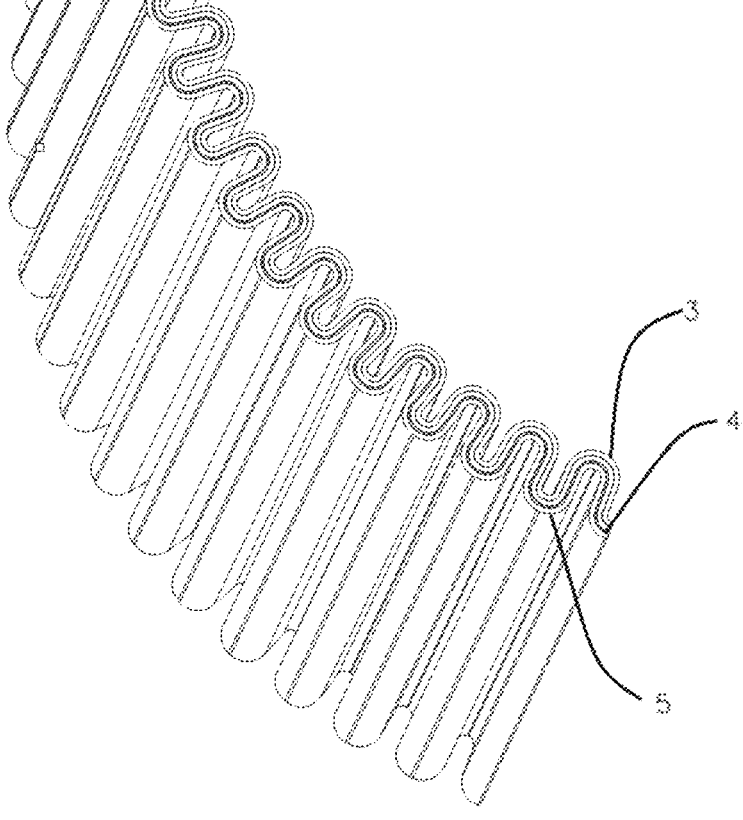
FIG. 3 is a schematic diagram of a structure of a first-stage filter element composite layer in Example 1.

Referring to FIG. 2, the filter assembly 1 sequentially includes a first-stage filter element composite layer 2, a second-stage filter element composite layer 6 and a third-stage filter element component 9 from outside to inside. Referring to FIG. 3, the first-stage filter element composite layer 2 sequentially includes an inner support layer 3, at least one micron-sized filter layer 4 and an outer support layer 5 from inside to outside, and the inner support layer 3 surrounds a composite carbon fiber layer 8. The inner support layer 3 is usually a non-woven fabric layer. In this example, the inner support layer 3 is a non-woven fabric layer of 30 g/m². In other examples, the inner support layer 3 may be a non-woven fabric layer of 40 g/m², a non-woven fabric layer of 50 g/m², a non-woven fabric layer of 60 g/m², a non-woven fabric layer of 70 g/m², a non-woven fabric layer of 80 g/m² or a non-woven fabric layer of 90 g/m². In this example, the outer support layer 5 is also a non-woven fabric layer, specifically a non-woven fabric layer of 30 g/m². In other examples, the outer support layer 5 may be a non-woven fabric layer of 40 g/m², a non-woven fabric layer of 50 g/m² or a non-woven fabric layer of 60 g/m². In this example, the micron-sized filter layer 4 consists of a 15-micron-sized meltblown filter layer and a 30-micron-sized meltblown filter layer. In other examples, the micron-sized filter layer 4 may consist of a 10-micron-sized meltblown filter layer and a 20-micron-sized meltblown filter layer, or may consist of a 10-micron-sized meltblown filter layer, a 17-micron-sized meltblown filter layer and a 20-micron-sized meltblown filter layer.

Figure 4:
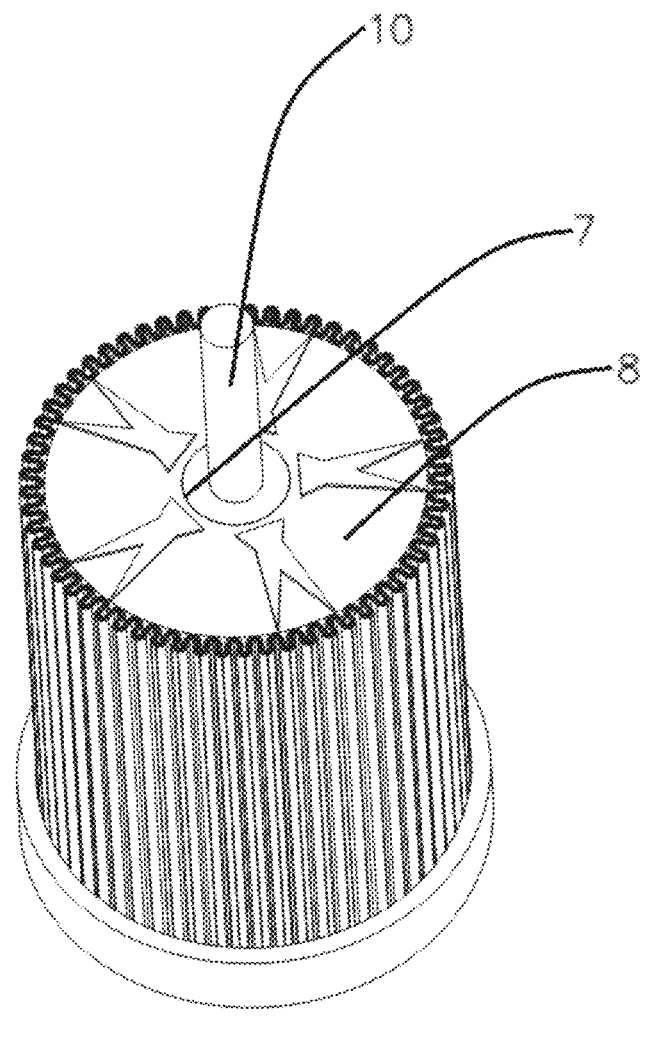
FIG. 4 is a schematic diagram of structures of a second-stage filter element composite layer and a third-stage filter element component in Example 1.

Referring to FIG. 4, the second-stage filter element composite layer 6 sequentially includes a support filter layer 7 and the composite carbon fiber layer 8 from inside to outside. The support filter layer 7 is of a cylindrical structure, and is a PP cotton stick filter layer in this example. A thickness of the PP cotton stick filter layer is 5 mm, and may be 1 mm, 2 mm, 3 mm or 4 mm in other examples. The composite carbon fiber layer 8 includes a carbon fiber layer and a wrapping filter layer wrapped on a surface of the carbon fiber layer, the wrapping filter layer is a non-woven fabric layer of 30 g/m² in this example, and the wrapping filter layer may be a non-woven fabric layer of 40 g/m², a non-woven fabric layer of 50 g/m², a non-woven fabric layer of 60 g/m², a non-woven fabric layer of 70 g/m², a non-woven fabric layer of 80 g/m² or a non-woven fabric layer of 90 g/m² in other example. A thickness of the composite carbon fiber layer 8 is 15 mm in the this example, and the thickness of the composite carbon fiber layer 8 may be 16 mm, 17 mm, 18 mm, 19 mm, 20 mm, 21 mm, 22 mm, 23 mm, 24 mm or 25 mm in other examples.

Referring to FIGS. 2 and 4, the third-stage filter element component 9 includes a filter container 10 and a filter material arranged in the filter container 10. The filter container 10 is generally made of plastic, and the filter container 10 is made of non-woven fabric in the this example. The filter material is a KDF material in this example.

Figure 5:
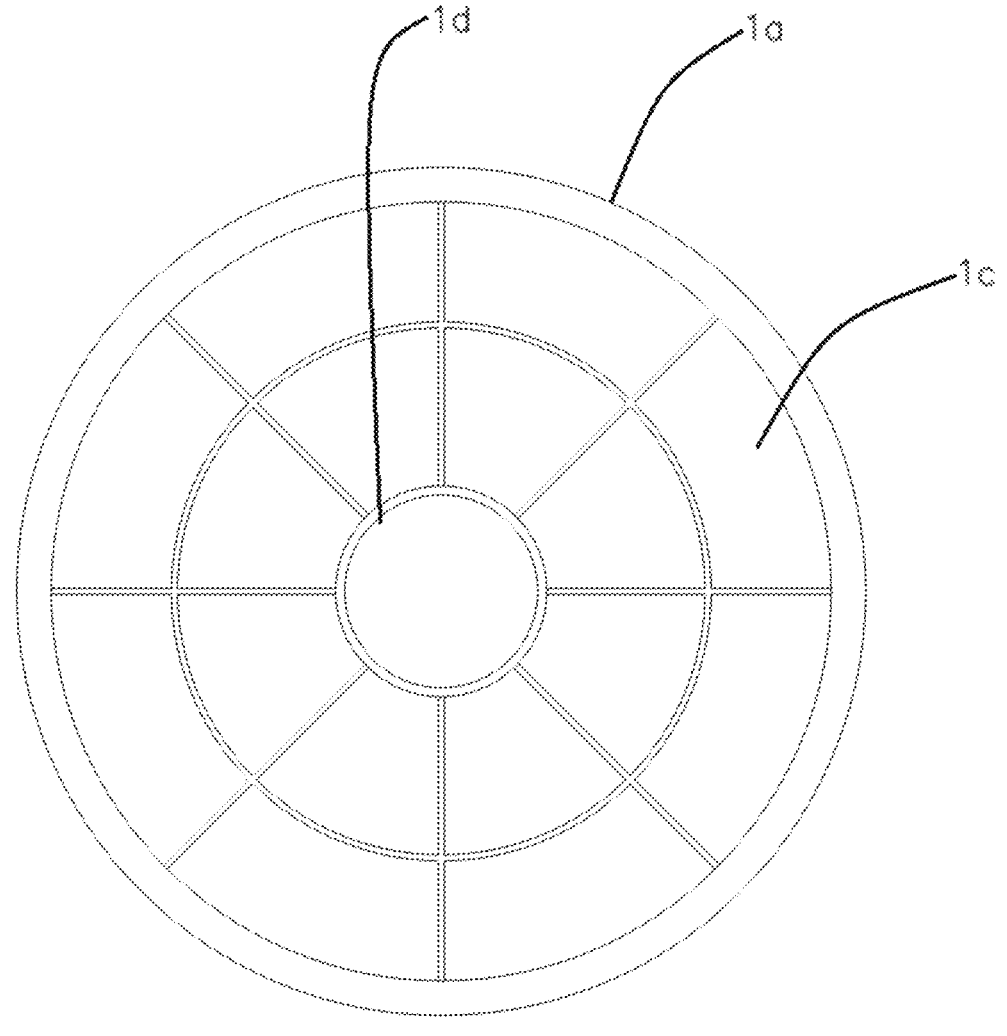
FIG. 5 is a schematic diagram of a structure of an upper end cover in Example 1.
Figure 6:
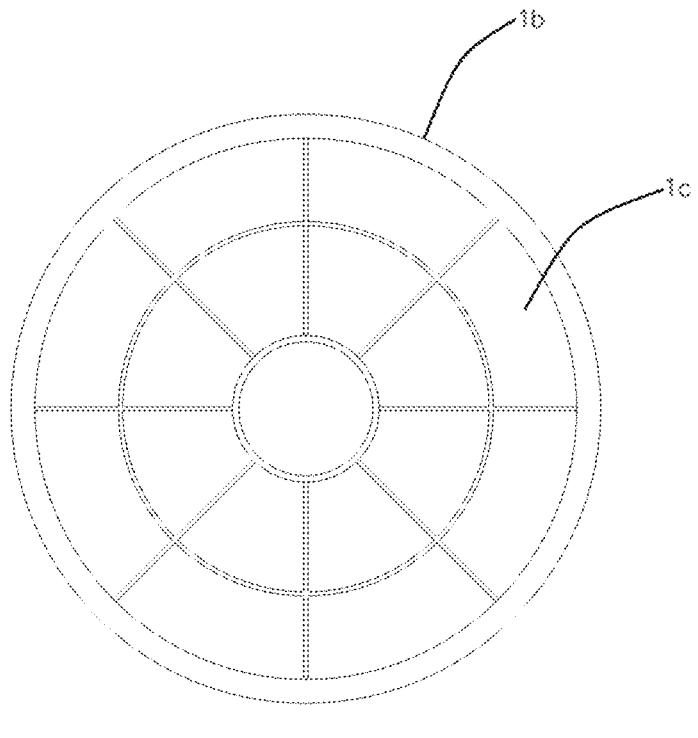
FIG. 6 is a schematic diagram of a structure of a lower end cover in Example 1.

Referring to FIGS. 1, 5 and 6, each of the upper end cover 1a and the lower end cover 1b is defined with a clamping groove 1c, the two ends of the filter assembly 1 can be inserted into the clamping grooves 1c respectively, a bottom of the clamping groove 1c of the upper end cover 1a is provided with a clamping post 1d, the clamping post 1d can be embedded into the support filter layer 7, and the lower end cover 1b is defined with a through hole.

Meanwhile, a bottom of the clamping groove 1c of the lower end cover (1b) is provided with a filter screen, and the filter screen is a stainless steel filter screen, a plastic filter screen, a glass filter screen or a ceramic filter screen.

Example 2

Disclosed is a shower filter element, and this example is different from Example 1 in that the composite carbon fiber layer is from Preparation Example 2.

Example 3

Disclosed is a shower filter element, and this example is different from Example 1 in that the composite carbon fiber layer is from Preparation Example 3.

COMPARATIVE EXAMPLES

Comparative Example 1

Disclosed is a shower filter element, and this comparative example is different from the Example 1 in that equal-thickness non-woven fabric layers of 90 g/m² are used to replace the micron-sized filter layers 4.
Detection Method/Test Method Service life test method: the filter elements from Example 1 and Comparative Example 1 were tested. The turbidity was spiked at 5±0.5 NTU throughout the test, and the service life of the filter elements was tested by water flow. At the end of each 1000 L water flow section, the outlet water flow rates of the filter elements under water pressures of 0.2 MPa and 0.41 MPa were tested, wherein the filter element is qualified if the outlet water flow rate is higher than 4 L/min after reaching a total water flow of 10,000 L. Experimental data are shown in table 2.

TABLE 2

| Service life test data of Example 1 | | |
| --- | --- | --- |
| Water flow (L) | Initial flow rate of 9 L/min, flow rate at fixed water pressure (0.21 MPa) (L/min) | Flow rate at 0.42 MPa (L/min) |
| 1,000 | 8.63 | 13.15 |
| 2,000 | 8.63 | 13.16 |
| 3,000 | 8.49 | 12.88 |
| 4,000 | 7.95 | 12.74 |
| 5,000 | 7.26 | 11.92 |
| 6,000 | 6.16 | 10.96 |
| 7,000 | 5.63 | 10.27 |
| 8,000 | 5.12 | 9.45 |
| 9,000 | 4.91 | 8.63 |
| 10,000 | 4.76 | 7.26 |

| Service life test data of Comparative Example 1 | | |
| --- | --- | --- |
| Water flow (L) | Initial flow rate of 9 L/min, flow rate at fixed water pressure (0.21 MPa) (L/min) | Flow rate at 0.42 MPa (L/min) |
| 1,000 | 6.33 | 10.23 |
| 2,000 | 5.64 | 9.98 |
| 3,000 | 5.62 | 8.95 |
| 4,000 | 4.96 | 7.84 |
| 5,000 | 4.56 | 6.59 |
| 6,000 | 4.21 | 5.11 |
| 7,000 | 3.98 | 4.56 |
| 8,000 | / | 3.56 |
| 9,000 | / | / |
| 10,000 | / | / |

From the above data, it can be seen that the flow rates under both water pressures show a significant decrease trend as the water flow increases. This indicates that during the use of the filter element, the filter material thereof may be gradually blocked by impurities, resulting in increased resistance to water flow through the filter element, and thus reducing the flow rate. However, the flow rate of the filter element according to the application is higher than 4 L/min when the water flow is 10,000 L, which shows that the service life of the filter element according to the present application can be more than 10,000 L, and the filter element has a longer service time.

Residual chlorine removal rate test: the filter elements from Example 1 and Comparative Example 1 were tested. Residual chlorine was spiked throughout the test. At the end of each 1000 L water flow section, the residual chlorine removal rates of the filter elements at a flow rate of 5 L/min were tested, wherein the spiked concentration of the residual chlorine throughout the test was 2.0+/−0.2 mg/L. Experimental data are shown in table 3.

TABLE 3

| Residual chlorine removal rate test data of Example 1 | | | | |
| Water flow (L) | Sampling flow rate (L/min) | Before filtering (g/L) | After filtering (g/L) | Removal rate (%) |
| --- | --- | --- | --- | --- |
| 0 | 7.6 | 2.19 | 0.01 | 99.54 |
| 5,000 | 6.23 | 2.18 | 0.03 | 98.62 |
| 10,000 | 4.35 | 2.19 | 0.02 | 96.34 |
| Residual chlorine removal rate test data of Comparative Example 1 | | | | |
| Water flow (L) | Sampling flow rate (L/min) | Before filtering (g/L) | After filtering (g/L) | Removal rate (%) |
| 0 | 7.6 | 2.19 | 1.29 | 41.10 |
| 5,000 | 6.23 | 2.19 | 0.03 | 33.33 |
| 10,000 | 4.35 | 2.18 | 0.02 | 23.39 |

The filter element from Example 1 has an excellent residual chlorine removal rate of more than 96% in the entire testing water flow range (OL to 10,000 L). This shows that this filter element can effectively adsorb or filter the residual chlorine in the water, and can also keep a high removal efficiency even in a later use stage. From OL to 5,000 L, and then to 10,000 L, the residual chlorine removal rate is not changed greatly, which indicates that the filter element has good performance stability. This is probably because the filter material inside the filter element has a large adsorption capacity and high durability, and does not saturate rapidly or degrade rapidly within a certain range of water flow.

This specific embodiment is merely an explanation of the present application and is not a limitation of the present application. A person skilled in the art, after reading the present specification, would have been able to make modifications to the present embodiment as required without inventive contribution, but only within the scope of the claims of the present application are protected by the patent law.

LISTING OF REFERENCE SIGNS

1. Filter Assembly;
2. First-stage Filter Element Composite Layer;
3. Inner Support Layer;
4. Micron-sized Filter Layer;
5. Outer Support Layer;
6. Second-stage Filter Element Composite Layer;
7. Support Filter Layer;
8. Composite Carbon Fiber Layer;

9. Third-stage Filter Element Component;
10. Filter Container;
11. Filter Material;
1a. Upper End Cover;
1b. Lower End Cover;
1c. Clamping Groove;
1d. Clamping Post.

What is claimed is:

1. A method of filtering shower bathing water comprising the steps of:

providing a cylindrical shower filter element including:

a filter assembly, an upper end cover and a lower end cover which are located at opposing ends of the filter assembly, wherein the upper end cover and the lower end cover are detachably connected to the filter assembly;

an outermost first-stage filter element composite layer including an inner support layer, at least one micron pore size filter layer having pores ranging from 10-30 microns, and an outer support layer;

a second-stage filter element composite layer including a support filter layer and a composite carbon fiber layer, the composite carbon fiber layer comprises a carbon fiber layer and a wrapping filter layer wrapping a surface of the carbon fiber layer, the support filter layer defines a cylindrical structure;

an innermost third-stage filter element component including a filter container and a filter material arranged in the filter container;

attaching the cylindrical shower filter element between a shower head and a shower water delivery conduit such that water may sequentially flow therethrough; and flowing water through the shower water delivery conduit, sequentially through each stage of the cylindrical shower filter element, delivering purified water to the shower head to be dispensed therefrom.

2. The method of filtering shower bathing water according to claim 1, wherein the first-stage filter element is pleated and formed into a circle along a side surface of the wrapping filter layer.

3. The method of filtering shower bathing water according to claim 1, wherein a thickness of the support filter layer is 1-5 mm, and a thickness of the composite carbon fiber layer is 15-25 mm.

4. The method of filtering shower bathing water according to claim 1, wherein the inner support layer and the wrapping filter layer are non-woven fabric layers of 30-90 g/m², and the outer support layer is a non-woven fabric layer of 30-60 g/m².

5. The method of filtering shower bathing water according to claim 1, wherein the support filter layer is a polypropylene (PP) cotton stick filter layer.

6. The method of filtering shower bathing water according to claim 1, wherein the filter material is a kinetic degradation fluxion (KDF) material.

7. The method of filtering shower bathing water according to claim 1, wherein each of the upper end cover and the lower end cover is defined with a clamping groove, and the opposing ends of the filter assembly are configured to be inserted into the clamping grooves respectively; a bottom of the clamping groove of the lower end cover is provided with a filter screen, and a bottom of the clamping groove of the upper end cover is provided with a clamping post.

* * * * *